(12) United States Patent
Radow

(10) Patent No.: US 11,874,054 B2
(45) Date of Patent: Jan. 16, 2024

(54) DRY ICE RECEPTACLE FOR CRYSTALLIZING, CONTAINING, AND SUBLIMATING DRY ICE AND DRY ICE DISPENSING DEVICE

(71) Applicant: Marc Radow, Reno, NV (US)

(72) Inventor: Marc Radow, Reno, NV (US)

(73) Assignee: THE ROXI GROUP, INC., Reno, NV (US)

( * ) Notice: Subject to any disclaimer, the term of this patent is extended or adjusted under 35 U.S.C. 154(b) by 363 days.

(21) Appl. No.: 16/909,536

(22) Filed: Jun. 23, 2020

(65) Prior Publication Data
US 2020/0400361 A1 Dec. 24, 2020

Related U.S. Application Data

(60) Provisional application No. 62/865,718, filed on Jun. 24, 2019.

(51) Int. Cl.
| F25D 3/14 | (2006.01) |
| F25D 31/00 | (2006.01) |
| F17C 3/00 | (2006.01) |
| A23L 2/54 | (2006.01) |

(52) U.S. Cl.
CPC .................. *F25D 3/14* (2013.01); *F17C 3/00* (2013.01); *F25D 31/003* (2013.01); *A23L 2/54* (2013.01); *A23V 2002/00* (2013.01); *F17C 2203/066* (2013.01); *F17C 2223/0138* (2013.01)

(58) Field of Classification Search
CPC ...... F25D 3/14; F25D 31/003; F25D 2500/02; F17C 3/00; F17C 2203/066; F17C 2223/0138; A23L 2/54; A23V 2002/00
USPC ......................................................... 62/121, 46
See application file for complete search history.

(56) References Cited

U.S. PATENT DOCUMENTS

| 4,405,348 A * | 9/1983 | Pasternack ................ F25D 3/14 |
| | | 62/372 |
| 5,180,079 A * | 1/1993 | Jeng ..................... A47G 19/065 |
| | | 220/709 |
| 6,868,694 B2 | 3/2005 | Nielsen |
| 7,272,950 B1 * | 9/2007 | Roman ..................... F25D 3/14 |
| | | 62/457.3 |

(Continued)

FOREIGN PATENT DOCUMENTS

| KR | 200256428 Y1 * | 8/2001 | |
| KR | 20070068316 A * | 6/2007 | |
| KR | 20220061460 A * | 5/2022 | ............. B65D 85/72 |

*Primary Examiner* — Miguel A Diaz
*Assistant Examiner* — Ibrahim A. Michael Adeniji
(74) *Attorney, Agent, or Firm* — Armstrong Teasdale LLP

(57) ABSTRACT

A dry ice receptacle is described. The dry ice receptacle includes a first portion defining a first opening, a second portion defining a second opening, and a curved exterior sidewall extending between the first portion and the second portion, and connecting the first portion and second portion, to define a receiving chamber arranged to contain a volume of dry ice. The dry ice receptacle also includes a curved interior sidewall extending between the first opening and the second opening. The interior sidewall is radially inward of the exterior sidewall and defines a straw channel, which may at least partially taper between the first opening and the second opening, and which is configured to receive a drinking straw. A fluid reservoir may also be included to allow accumulation of liquid under the straw channel.

20 Claims, 10 Drawing Sheets

(56) References Cited

U.S. PATENT DOCUMENTS

| | | | |
|---|---|---|---|
| 2004/0035144 A1* | 2/2004 | Nielsen | F25D 3/14 |
| | | | 62/457.3 |
| 2006/0186128 A1* | 8/2006 | Summers | B67D 1/10 |
| | | | 220/705 |
| 2010/0031678 A1* | 2/2010 | Roman | A47G 19/2288 |
| | | | 62/121 |
| 2012/0325835 A1* | 12/2012 | Merino | A47G 21/181 |
| | | | 83/23 |
| 2014/0027460 A1* | 1/2014 | Vovan | B65D 21/0228 |
| | | | 220/574 |
| 2014/0099423 A1* | 4/2014 | Furrow | B65D 85/72 |
| | | | 426/590 |
| 2015/0274537 A1 | 10/2015 | Myers et al. | |

\* cited by examiner

DRY ICE RECEPTACLE FOR CRYSTALLIZING, CONTAINING, AND SUBLIMATING DRY ICE AND DRY ICE DISPENSING DEVICE

CROSS REFERENCE TO RELATED APPLICATION

This application claims priority to and the benefit of U.S. Provisional Patent Application No. 62/865,718, filed Jun. 24, 2019 and entitled "CARBON DIOXIDE CRYSTALLIZATION, SUBLIMATION, AND TRANSPORTATION DEVICE," the disclosure of which is hereby incorporated by reference in its entirety.

BACKGROUND

The field of the disclosure generally relates to systems and methods for crystallizing, containing, and sublimating carbon dioxide, and more particularly to systems and methods for crystallizing, containing, and sublimating carbon dioxide in a dry ice receptacle.

In the hospitality industry, it is often desirable to produce food items, including beverages, that are visually to appealing customers. For example, it is common for hotels, restaurants, and others who utilize food and beverage to entertain to offer beverages that are brightly colored and include visual elements, such as curved straws and drink umbrellas, arranged to add an additional aspect of excitement and interest to the beverage.

In some cases, there have been attempts to add solid carbon dioxide (also known as "dry ice") to beverages. Specifically, dry ice, which may exist at temperatures below approximately −56.4 degrees Celsius, can be compressed into a solid block and added to a liquid, such as a liquid beverage, to produce a bubbling and "smoking" or "fogging" effect. In physical terms, the dry ice sublimates in the presence of the aqueous liquid, which may or may not include alcohol, to create carbon dioxide gas and water vapor, and if the dry ice is submerged in the liquid, the gas and water vapor may bubble to the surface of the liquid, producing a dense, bubbling layer of fog that accumulates on the liquid surface.

However, the density of dry ice is lower than that of liquid water. As a result, blocks of dry ice tend to float on the surfaces of most beverages into which such blocks are placed. This reduces, and in some cases eliminates, the desired smoking, bubbling, effect that placement of dry ice within the liquid is otherwise intended to produce. Further, frozen carbon dioxide can be difficult to maintain in its frozen form.

Accordingly, at least some systems and devices for producing less compact forms of dry ice and separating or enclosing dry ice have been introduced. However, the density of dry ice, in any form, is lower than that of liquid water, whether or not with or without alcohol, and again, tending to float, and many conventional systems do not include any mechanism for ensuring that a body of encapsulated dry ice will remain submerged in a beverage. In addition, conventional systems exclude geometries that permit, facilitate, and guide flow of liquid around, under, and through the containing device.

BRIEF SUMMARY

In one aspect, a dry ice receptacle is described. The dry ice receptacle includes a first portion defining a first opening, a second portion defining a second opening, and a curved exterior sidewall extending between the first portion and the second portion, and connecting the first portion and second portion, to define a receiving chamber arranged to contain a volume of dry ice. The dry ice receptacle also includes a curved interior sidewall extending between the first opening and the second opening. The interior sidewall is radially inward of the exterior sidewall and defines a straw channel configured to receive a drinking straw.

In another aspect, a container for holding a volume of dry ice is described. The container includes a first portion including at least a first aperture, a second portion including at least a second aperture, and a curved third portion extending between the first portion and the second portion. The curved third portion connects the first portion and the second portion, and the first portion, the second portion, and the curved third portion define an interior region of the container. The container also includes a curved fourth portion extending between the first portion and the second portion. The curved fourth portion is disposed radially inward of the curved third portion and defines a channel that passes through the interior portion and fluidly connects the first aperture to the second aperture.

In yet another aspect, a system is described. The system includes a dry ice dispensing device, and a dry ice receptacle. The dry ice dispensing device includes a control valve configured to receive liquid carbon dioxide, and an ejection nozzle coupled to the control valve. The ejection nozzle is configured to receive the liquid carbon dioxide from the control valve and to dispense dry ice in response to the control valve being opened. The dry ice receptacle includes a first portion defining a first opening and a dispenser opening. The dry ice receptacle is configured to be seated on the ejection nozzle, and the dry ice receptacle is configured to receive dry ice from the ejection nozzle through the dispenser opening. The dry ice receptacle also includes a second portion defining a second opening, and a curved exterior sidewall extending between the first portion and the second portion, and connecting the first portion and second portion, to define a receiving chamber arranged to contain the dry ice. In addition, the dry ice receptacle includes a curved interior sidewall extending between the first opening and the second opening. The curved interior sidewall is radially inward of the exterior sidewall and defines a straw channel configured to receive a drinking straw.

DETAILED DESCRIPTION

Figure 1:
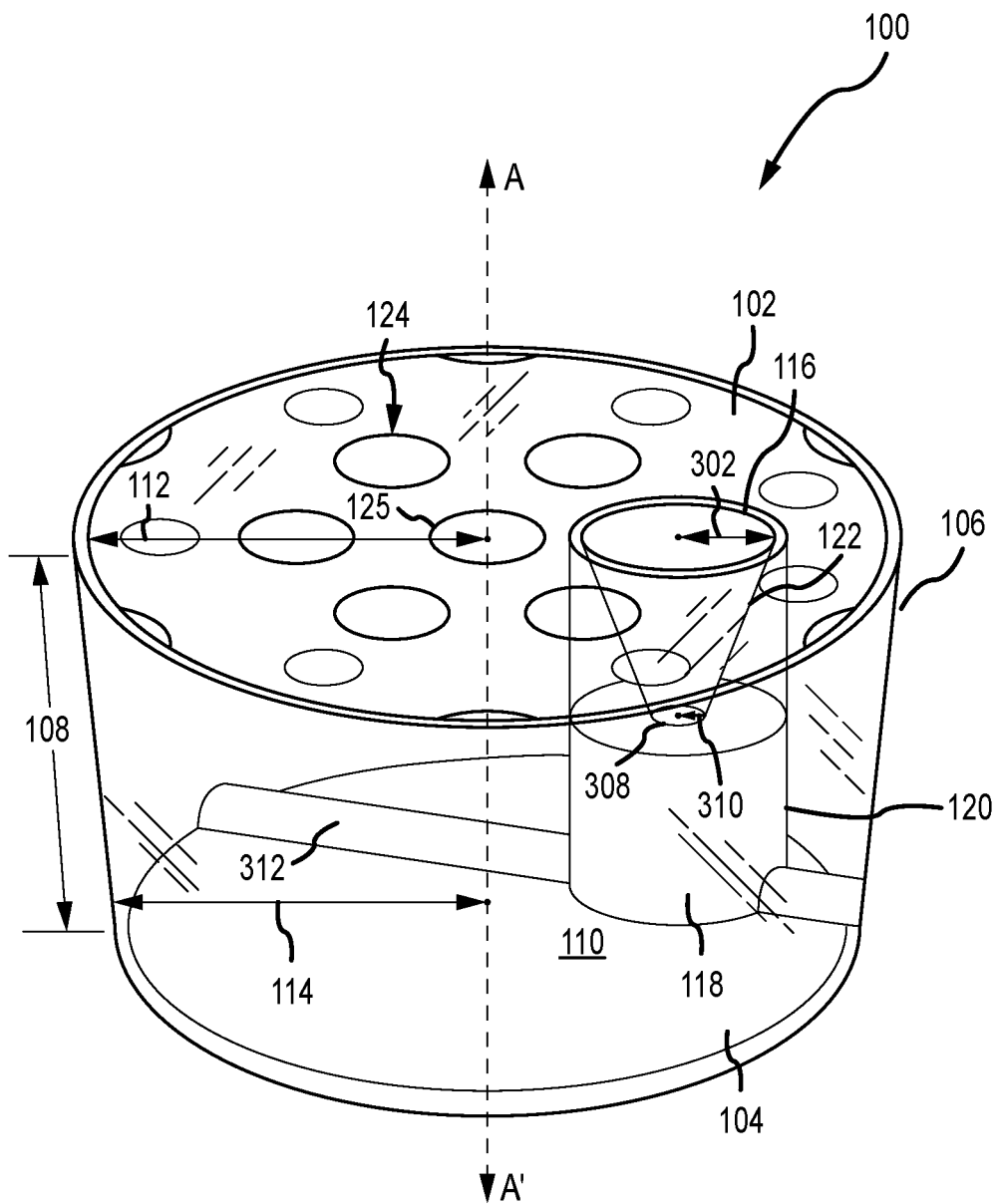
FIG. 1 is a perspective view of an example embodiment of a dry ice receptacle.

A dry ice receptacle and a dry ice dispensing device are disclosed. In various embodiments, the dry ice receptacle includes an object, which may taper between an upper surface and a lower surface, and which defines a receiving chamber or interior portion, within which dry ice may form and crystallize and from which dry ice may be allowed to sublimate. In some embodiments, the dry ice receptacle includes a straw channel, which may extend between the upper surface and the lower surface, and which may be arranged to receive, and create an interference fit with a drinking straw of any suitable construction (e.g., plastic, paper, metal, wood, bamboo, and the like). In some embodiments, the straw channel is separated from the receiving chamber to isolate liquid drawn up (e.g., by the drinking straw) through the straw channel and to prevent contact between the liquid immediately being consumed and the dry ice contained in the receiving chamber.

The dry ice receptacle may be deposited in a liquid, such as a beverage, and maintained, at least partially, in a submerged condition by a force applied by the drinking straw. Further, in at least some embodiments, a groove or channel may run along one or more external surfaces, such as the lower surface of the dry ice receptacle, to channel the beverage into the straw channel. In some embodiments, a pocket or reservoir may be included between the straw channel and the groove to permit accumulation of liquid for better uptake by the drinking straw. A plurality of holes may, in addition, be disposed in the upper surface. These may permit entry of the liquid into contact with the dry ice contained in the receptacle, and escape of carbon dioxide gas into the liquid as the dry ice sublimates in the presence of the liquid. As a result, the dry ice receptacle may facilitate and/or accelerate sublimation of the carbon dioxide contained, as described, within the receptacle for visual and other presentation and entertainment purposes.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, spatially relative terms, such as "beneath," "below," "under," "underneath," "lower," "higher," "above," "over," "top," "bottom," and the like, may be used to describe one element or feature's relationship to one or more other elements or features as illustrated in the figures. It will be understood that such spatially relative terms are intended to encompass different orientations of the elements and features described herein both in operation as well as in addition to the orientations depicted in the figures. For example, if an element or feature in the figures is turned over, elements described as being "below" one or more other elements or features may be regarded as being "above" those elements or features. Thus, exemplary terms such as "below," "under," or "beneath" may encompass both an orientation of above and below, depending, for example, upon a relative orientation between such elements or features and one or more other elements or features.

Further, as used herein, the term "dry ice" may be used to refer to carbon dioxide in a solid, crystallized, and/or frozen form. It will be appreciated, as described herein, that carbon dioxide may exist in solid, liquid, and gas phases.

Figure 2:
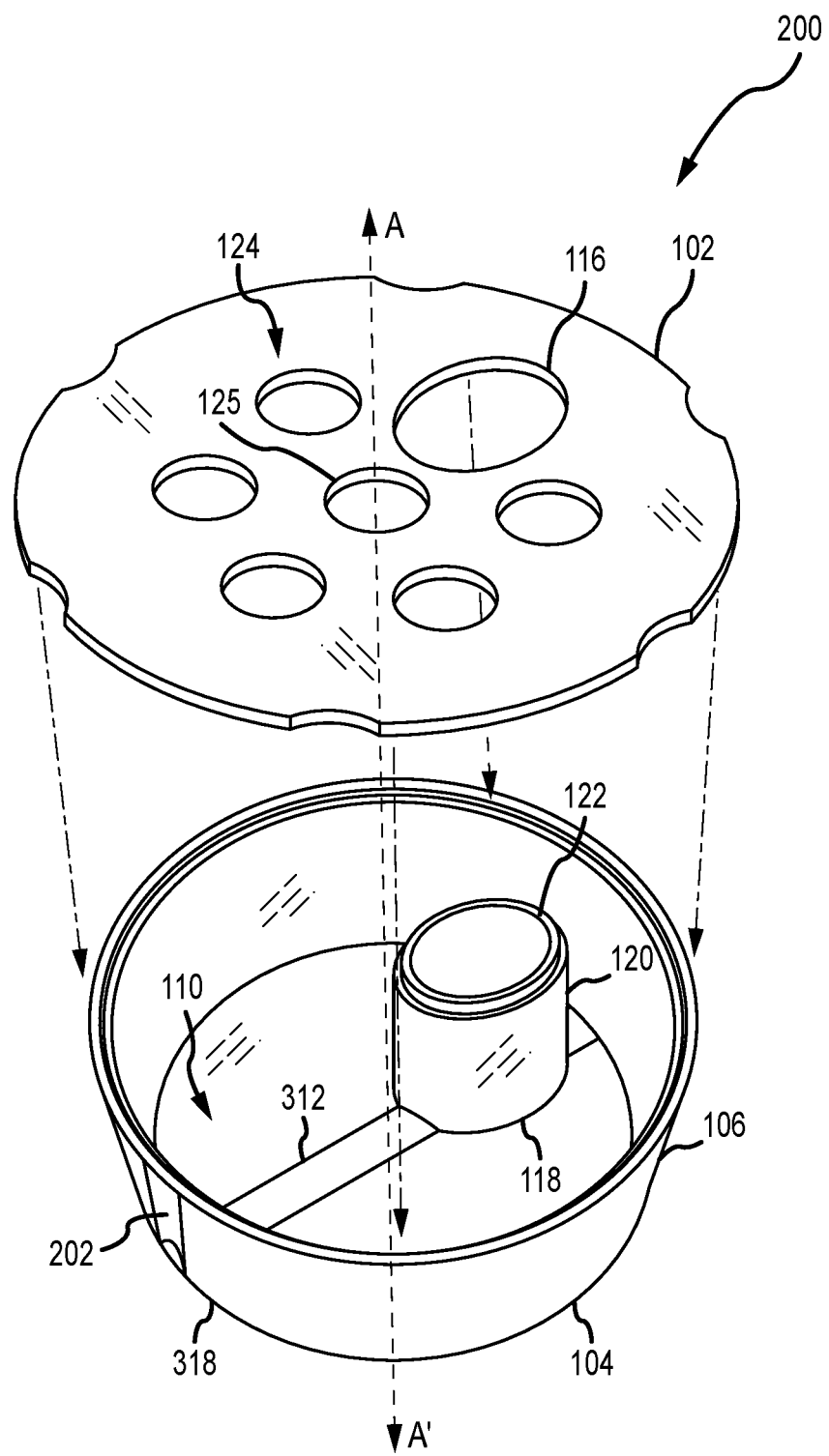
FIG. 2 is an exploded view of an alternate embodiment of a dry ice receptacle, in which the dry ice receptacle includes an additional sidewall channel.
Figure 3:
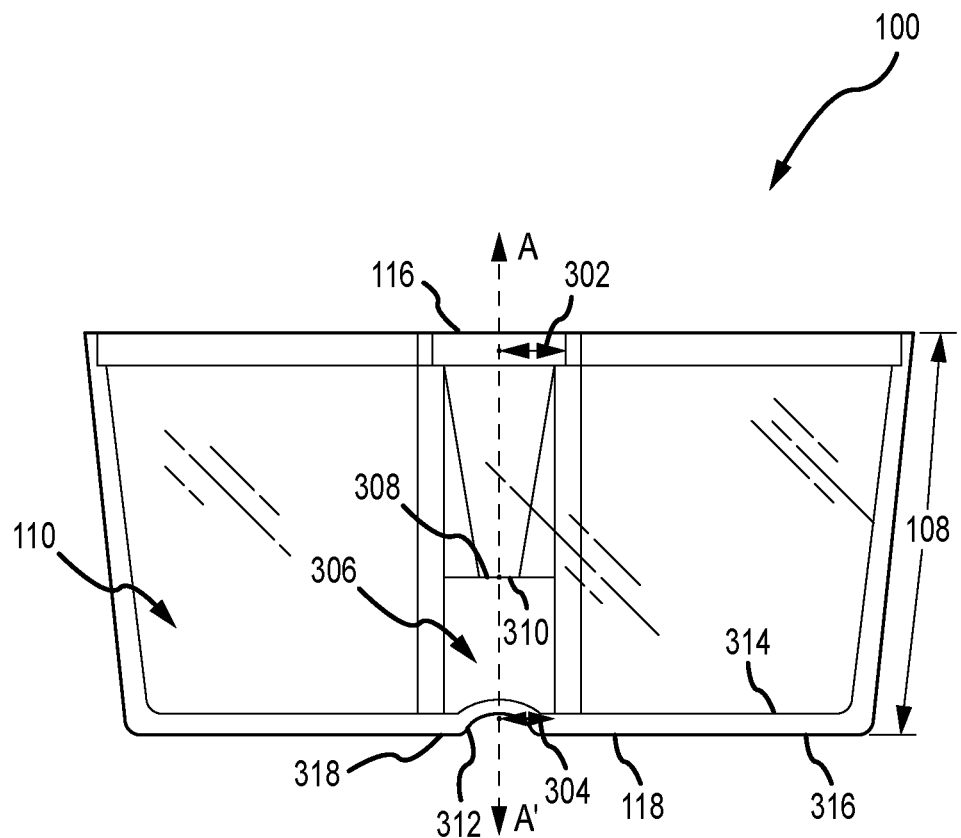
FIG. 3 is a side view of the example embodiment of the dry ice receptacle shown in FIG. 1.
Figure 4:
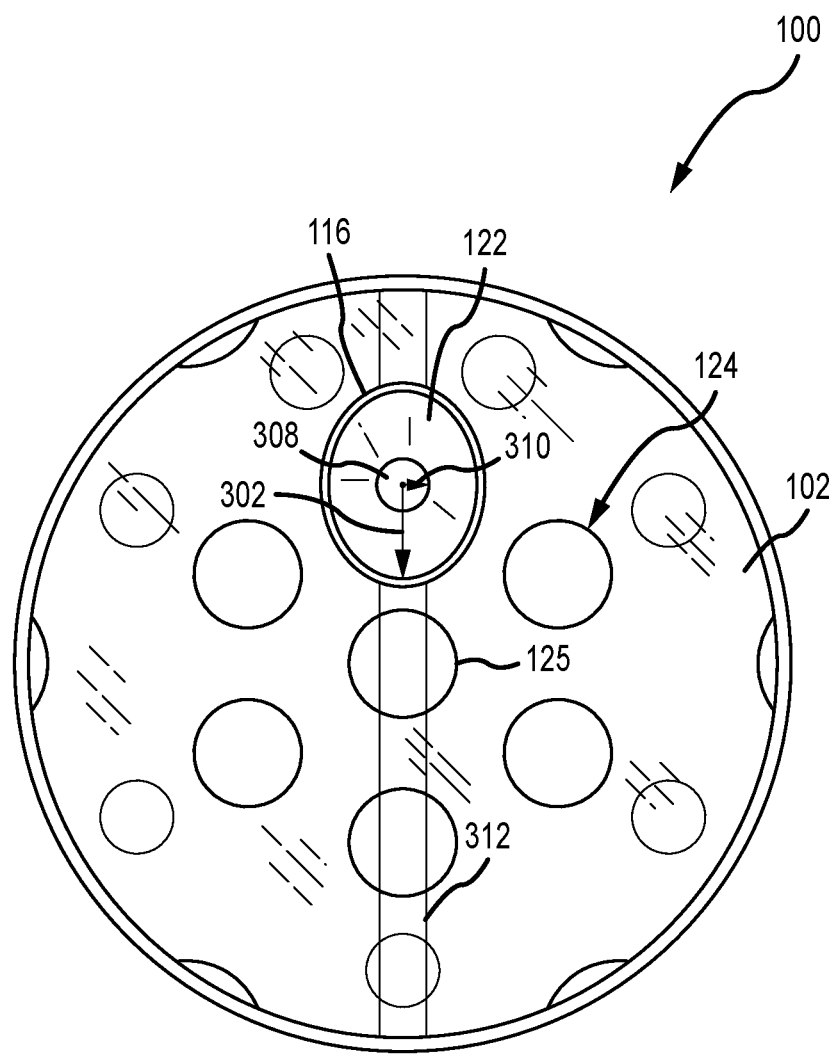
FIG. 4 is a top view of the example embodiment of the dry ice receptacle shown in FIG. 1.

FIG. 1 through FIG. 4 show different views of a dry ice receptacle. Specifically, FIG. 1, FIG. 3 and FIG. 4 show different views of a first embodiment of a dry ice receptacle 100, and FIG. 2 shows an exploded view of an alternate embodiment of a dry ice receptacle 200, which is substantially the same as the embodiments shown in FIG. 1, FIG. 2, and FIG. 3, except that the embodiment shown in FIG. 2 includes a sidewall channel 202.

As used herein, dry ice receptacle 100 may also be referred to as a "container" or a "container for holding a volume of dry ice." In addition, as described herein, in the example embodiment, dry ice receptacle 100 is configured to receive a flow of carbon dioxide, such as liquid carbon dioxide, which may decompress and crystallize in solid form within dry ice receptacle 100 to form a volume of dry ice within dry ice receptacle 100.

Accordingly, as shown with reference to FIG. 1 to FIG. 4, in at least some embodiments, dry ice receptacle 100 includes a first portion 102, a second portion 104, and a curved exterior sidewall 106 (or third portion) that extends between and connects first portion 102 and second portion 104. In the example embodiment, first portion 102 and second portion are substantially planar, and curved exterior sidewall 106 is substantially annular.

Although not central to an understanding of the present disclosure, in various embodiments, dry ice receptacle 100, including first portion 102, second portion 104, and curved exterior sidewall 106, may include individual components, which may be connected or coupled to construct dry ice receptacle 100. Likewise, in other embodiments, one or more elements of dry ice receptacle 100 may be integrally formed, such as by way of an injection molding technique, and the materials used may, as described, include materials capable of withstanding (without shattering or breaking) cold temperatures associated with dry ice. However, in general terms, any suitable manufacturing technique may be implemented, and dry ice receptacle 100 may include a variety of individual elements that may be connected to form the completed receptacle and/or integrally manufactured as one or more components.

First portion 102, second portion 104, and curved exterior sidewall 106 may thus form a puck or cylindrical shape having a width 108. In various embodiments, width 108 may range from 0.25 inch to 4.0 inches; however, any of a variety of suitable dimensions are contemplated. For example, for some large drinking vessels, width 108 may exceed 4.0 inches. Further, first portion 102, second portion 104, and exterior sidewall 106 may define a receiving chamber 110 (or interior region), which may be configured to receive and/or contain a volume of dry ice, as described herein. Width 108 may thus vary (in addition to one or more other dimensions) to accommodate any suitable volume of dry ice.

In some embodiments, first portion 102 is substantially circular and includes a first radial dimension 112, as is typical for the inner dimension of a variety of common drinkware. Likewise, second portion 104 may be substantially circular and may include a second radial dimension 114. In at least some embodiments, first radial dimension 112 is greater than second radial dimension 114. As a result, in various embodiments, curved exterior sidewall 106 may extend at an angle between first portion 102 and second portion 104. Stated another way, dry ice receptacle 100 may be in the shape of a cylinder that tapers between first portion 102 and second portion 104 (e.g., a truncated cone). In another embodiment, first radial dimension 112 and second radial dimension 114 may be substantially identical, in which case, dry ice receptacle 100 may not taper between first portion 102 and second portion 104. Rather, in at least some embodiments, dry ice receptacle 100 may be cylindrically shaped.

More generally, dry ice receptacle 100 may be shaped for insertion in any of a variety of drinking vessels (e.g., pint glasses, shot glasses, margarita glasses, souvenir and custom drinking vessels, and the like). As a result, the dimensions of dry ice receptacle 100 may be adjusted, during manufacturing, to conform to one or more dimensions of any desired drinking vessel, including any of a variety of generally annular drinking vessels as well as any other shaped vessel, such as polygonal drinking vessels. In the example embodiment, dry ice receptacle 100 may suitably conform to the dimensions of a pint glass or shot glass (which may taper moving toward the bottom of the vessel). Likewise, dry ice receptacle 100, e.g., in a cylindrical configuration, may conform to one or more dimensions of a vertical-sided drinking vessel.

Dry ice receptacle 100 may be manufactured from a variety of materials. For example, in some embodiments, dry ice receptacle 100 may include a hard or rigid plastic, which may resist deformation when dry ice receptacle 100 is inserted in a drinking vessel. In the example embodiment, as shown, dry ice receptacle includes a transparent or semi-transparent plastic, which permits visual inspection of an amount of dry ice contained by dry ice receptacle 100 after being filled, as described herein. Likewise, in some embodiments, dry ice receptacle 100 may include a shatter-resistant glass, such as floated borosilicate glass, and/or any of a variety of metals or metallic materials (e.g., stainless steel, aluminum). However, in other embodiments, dry ice receptacle 100 may include a softer or substantially non-rigid plastic, such as any of a variety of polyvinyl materials or plastic polymers, rubber, and the like.

In addition, in at least some embodiments, dry ice receptacle 100 may include any of a variety of ingestible substances, such as food colorings or food additives, including, for example, salt or sugar, and the like. In at least one embodiment, dry ice receptacle 100 is edible, such as, for example, a hard sugar or candy. Further, dry ice receptacle 100 may, for food safety, be packaged or enclosed in a plastic wrapper, which may be removed prior to use.

In the example embodiment, first portion 102 also includes a first aperture or opening 116. Likewise, second portion 104 includes a second aperture or opening 118, which may be axially aligned with first opening 116. In various embodiments, first opening 116 and second opening 118 may be disposed at any location on first portion 102 and second portion 104, respectively. However, in at least one embodiment, first opening 116 and second opening 118 may be radially offset from a central axis A-A'. As a result, in various embodiments, first opening 116 and/or second opening 118 may be located anywhere on first portion 102 and second portion 104, respectively.

In addition, in some embodiments, dry ice receptacle 100 includes a curved interior sidewall 120, which extends radially inward of curved exterior sidewall 106 between first opening 116 and second opening 118, and which at least partially defines a straw channel 122 that passes through receiving chamber 110. In the example embodiment, straw channel 122 therefore passes through receiving chamber 110 and is not configured to be filled with dry ice (however, dry ice may surround straw channel 122 outside of interior sidewall 120). Rather, as described herein, straw channel 122 is configured to receive a drinking straw, which may be inserted in straw channel 122 and used to draw a liquid up through straw channel 122.

Moreover, although shown offset from axis A-A', straw channel 122 may be located at any suitable location of dry ice receptacle 100. For example, straw channel 122 may extend through and be coaxial with axis A-A' as well as offset from axis A-A' at any location. In addition, in various embodiments, straw channel 122 may extend in a substantially straight line through receiving chamber 110 or, in some embodiments, in an arc or curve through receiving chamber 110. In an embodiment that includes a curving straw channel 122, the curve may be introduced to add an additional aspect of entertainment or visual appeal to dry ice receptacle 100.

With reference to FIG. 3 and FIG. 4, in various embodiments, straw channel 122 may taper at least partway between first opening 116 and second opening 118. For example, straw channel 122 may taper from a first radial dimension 302 (e.g., a first radius) near first opening 116 to a second radial dimension 304 (e.g., a second radius) near second opening 118. In addition, in various embodiments, first opening 116 may be the same as and/or different from second opening 118 in one and/or two dimensions (e.g., the dimensions of openings 116 and 118 may be the same and/or different in either or both of the x- and y-directions).

In some embodiments, second opening 118 may form a pocket or reservoir 306 that extends partway into receiving chamber 110 and fluidly couples to straw channel 122. In this embodiment, straw channel 122 may taper between first opening 116 and an intermediate opening 308, having at least one third radial dimension 310. As a result, reservoir 306 may expand to a larger diameter between intermediate opening 308 and second opening 118 at the base of dry ice receptacle 110 to provide a space for liquid to accumulate. Stated another way, straw channel 122 may taper from first opening 116 until straw channel 122 reaches intermediate opening 308, which may include a radial dimension (e.g., a diameter) that is less than the diameters of first opening 116 and second opening 118, and which fluidly couples straw channel 122 to reservoir 306.

Straw channel 122 may thus function to form an interference or friction fit between a drinking straw inserted in straw channel 122 and curved interior sidewall 120. As a result, straw channel 122 may compress or pinch a straw inserted therein to hold the straw in place within straw channel 122. Further, during operation, liquid may accumulate in reservoir 306 to be drawn up into the tapering portion of straw channel 122 created by the suction or vacuum pressure formed between a drinking straw (when drawn on by a human) and straw channel 122.

Moreover, in at least some embodiments, first opening 116, intermediate opening 308, and second opening 118 may be variously shaped. For example, in some embodiments, first opening 116 may be elliptically shaped or circularly shaped. Likewise, in some embodiments, intermediate opening 308 and second opening 118 may be elliptically shaped or circularly shaped. In the example embodiment, first opening 116, intermediate opening 308, and second opening 118 are elliptically shaped. However, any suitable combination of circular, elliptical, and/or other shapes may be implemented.

With returning reference to FIG. 1, in the example embodiment, first portion 102 may also include a plurality of additional apertures or openings 124, which may fluidly couple receiving chamber 110 to an exterior region of dry ice receptacle 100. For example, openings 124 may permit fluid contact between dry ice contained within dry ice receptacle 100 and a fluid or liquid (e.g., open air, a liquid beverage) surrounding dry ice receptacle 100. As a result, as described herein, dry ice may sublimate in the presence of a fluid or liquid that enters dry ice receptacle 100 via openings 124, and carbon dioxide gas may be permitted to escape dry ice receptacle 100 through openings 124. Further, at least one of openings 124, such as central opening 125, may be used as a dispenser opening, which may engage with a dry ice dispensing device, such as dry ice dispensing device 600 and/or dry ice dispensing device 800, to receive dry ice within receiving chamber 110 of dry ice receptacle 100. In various embodiments, central opening 125 may be located at any position of first portion 102. For example, in some embodiments, central opening 125 is located substantially coaxial with axis A-A'. However, in other embodiments, central opening 125 may be offset from axis A-A' as desired.

Accordingly, in the example embodiment, dry ice receptacle 100 includes at least one channel or groove 312 configured to bring liquid around, over, and/or under dry ice receptacle 100 and into reservoir 306 and/or straw channel 122. More particularly, second portion 104 includes an inner surface 314 arranged to contact dry ice contained within receiving chamber 110 and an outer surface 316 arranged to contact a liquid (e.g., a beverage) when dry ice receptacle 100 is submerged or placed within a liquid, as described herein.

In the example embodiment, groove 312 is formed in second portion 104, such that a portion of outer surface 316 is raised above a level of the plane otherwise defined by second portion 104. Further, as shown, groove 312 extends from at least one edge 318 of second portion 104 to second opening 118 of second portion 104 (e.g., toward reservoir 306). As a result, groove 312 is capable of transferring or carrying a liquid (e.g., a beverage) disposed around dry ice receptacle 100, through groove 312, to second opening 118 and/or reservoir 306. Stated another way, in the example embodiment, groove 312 allows liquid to travel underneath dry ice receptacle 100 and into reservoir 306 and/or straw channel 122. In addition, in various embodiments, a plurality of grooves, including groove 312 may be included in second portion 104, and each groove may fluidly couple to straw channel 122, as described.

With reference to FIG. 2, an alternate embodiment of a dry ice receptacle 200 is shown. Dry ice receptacle 200 is the same as dry ice receptacle 100, except that dry ice receptacle 200 includes a sidewall channel 202, which may extend at least partially along curved exterior sidewall 106, and which may fluidly couple to groove 312 to facilitate fluid flow between an interior surface or edge of a drinking vessel 502 and curved exterior sidewall 106. For example, in at least one embodiment, sidewall channel 202 extends between first portion 102 and second portion 104. Further, in various embodiments, sidewall channel 202 may extend substantially in a straight line and/or sidewall channel 202 may include one or more curves (e.g., for visual appeal). Likewise, in various embodiments, a plurality of sidewall channels may be provided, and each may fluidly couple to groove 312.

Figure 5:
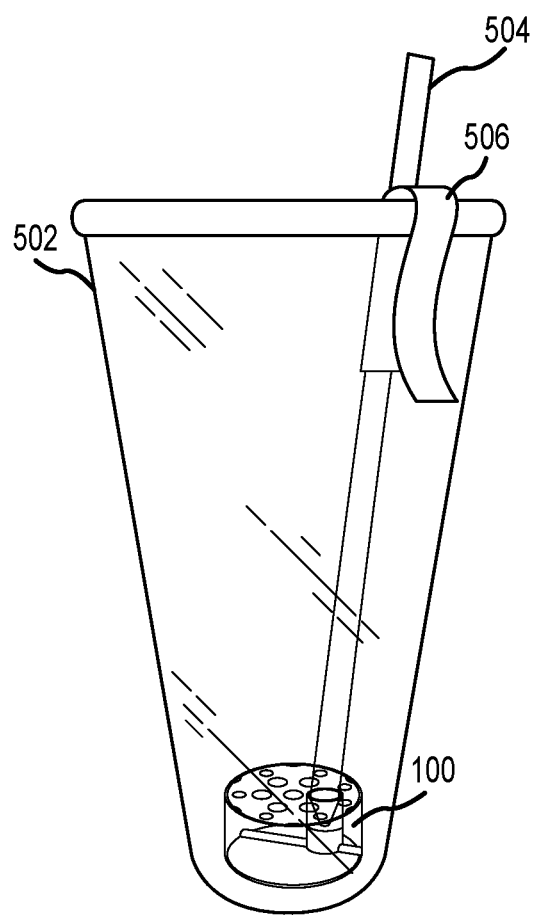
FIG. 5 is a perspective view of an example embodiment of a drinking vessel that contains the dry ice receptacle shown in FIG. 1.

FIG. 5 is a side view of a drinking vessel 502 containing dry ice receptacle 100, and generally illustrates operation of dry ice receptacle 100 when dry ice receptacle has received and contains a volume of dry ice (as described herein) and placed in drinking vessel 502, such as at a restaurant.

Accordingly, in the example embodiment, after dry ice receptacle 100 has received and contains a volume of dry ice, dry ice receptacle 100 may be placed, such as by waitstaff at a restaurant, in drinking vessel 502, such as, for example, a pint glass, a shot glass, a margarita glass, and the like. As described herein, insertion of dry ice receptacle 100 containing dry ice within drinking vessel 502 containing an aqueous beverage results in rapid sublimation of the dry ice contained within dry ice receptacle 100. Sublimation of dry ice from dry ice receptacle 100 results, in turn, in the release of carbon dioxide gas and water vapor, which bubbles up through the liquid, e.g., from the bottom of drinking vessel 502 to the surface of the liquid in drinking vessel 502 (creating "smoke" or "fog"). In addition to the visual appeal that the bubbling release of carbon dioxide and water vapor (or "smoke") produces, water ice contained in drinking vessel 502 may also jostled and disturbed, which may create an audible sound (engaging the consumer's senses). This same interaction causes a vibration. The vibration may intensify the sense of touch. Likewise, the rapid release of gas and water vapor may also amplify the release the aroma of the beverage contained in drinking vessel 502, resulting in an additional sensory impact. Collectively, these create an interactive consumer experience.

In the example of FIG. 5, curved exterior sidewall 106 of dry ice receptacle 100 tapers slightly between first portion 102 and second portion 104. As a result, dry ice receptacle 100 may be placed in a drinking vessel, such as drinking vessel 502, that also includes a tapering or angled sidewall (e.g., a pint glass, as illustrated) in a manner that facilitates secure placement of dry ice receptacle 100 at the base of drinking vessel 502.

Here, because dry ice receptacle 100 includes a shape that conforms to at least a portion of the shape of drinking vessel 502, at least one technical improvement embodied by the present disclosure is that dry ice receptacle 100 may demonstrate a tendency to remain at the bottom of drinking vessel 502 rather than simply float to the top of drinking vessel 502. More particularly, in at least some embodiments, it is important that dry ice receptacle 100 remain securely submerged at the bottom of drinking vessel 502 to maintain fluid contact between the dry ice contained by dry ice receptacle 100 and the liquid (e.g., the beverage) contained in drinking vessel 502 (e.g., to facilitate sublimation of the frozen carbon dioxide and for the sublimated carbon dioxide gas to pass through the beverage). The shape of dry ice receptacle 106 may therefore conform to the shape of drinking vessel 502 to maintain better submergence of dry ice receptacle within drinking vessel 502. Further, in at least some embodiments, placement of holes 124 only in first portion 102 of dry ice receptacle 100 and/or the tapered shape of dry ice receptacle 100 may facilitate creation of a downward force on dry ice receptacle 100 (e.g., as carbon dioxide gas bubbles out of holes 124 toward the liquid surface) that also causes dry ice receptacle 100 to tend toward or remain submerged at the base of drinking vessel 502. In addition, in at least some embodiments, the shape of dry ice receptacle 100 may result in the creation of a hydrostatic force or suction acting down (toward the bottom of drinking vessel 502), which further causes dry ice receptacle 100 to remain submerged in the beverage.

In addition, to further secure dry ice receptacle 100 in a submerged position, in at least some embodiments, a drinking straw 504 may be inserted into straw channel 122, which may as described herein, taper to facilitate an interference or friction fit between drinking straw 504 and dry ice receptacle 100. The person consuming the beverage may apply downward force on drinking straw 504 to further retain dry ice receptacle 100 in a submerged position. Likewise, the individual may withdraw dry ice receptacle 100 from the beverage by applying an upward force on drinking straw 504, such as, for example, if the individual wishes to remove dry ice receptacle 100 from drinking vessel 502 and/or to temporarily raise dry ice receptacle 100 above a level of the liquid in drinking vessel 502 to conserve dry ice remaining in dry ice receptacle 100 for later use. Stated another way, the interference fit between drinking straw 504 and straw channel 122 may permit the individual to withdraw dry ice receptacle 100 from the beverage using drinking straw 504, which can be frictionally engaged with straw channel 122. In some embodiments, as shown, a straw clip 506 may be attached between drinking straw 504 and drinking vessel 502 to further restrain dry ice receptacle 100 at the base of drinking vessel 502.

Prior to placement in drinking vessel 502, dry ice receptacle 100 may be filled, or "charged," with dry ice. Specifically, in at least one embodiment, central opening 125 may be used as a dispenser opening, which may engage with a dry ice dispensing device, such as dry ice dispensing devices 600 and/or 800, described below, to receive dry ice within receiving chamber 110 of dry ice receptacle 100.

Figure 6:
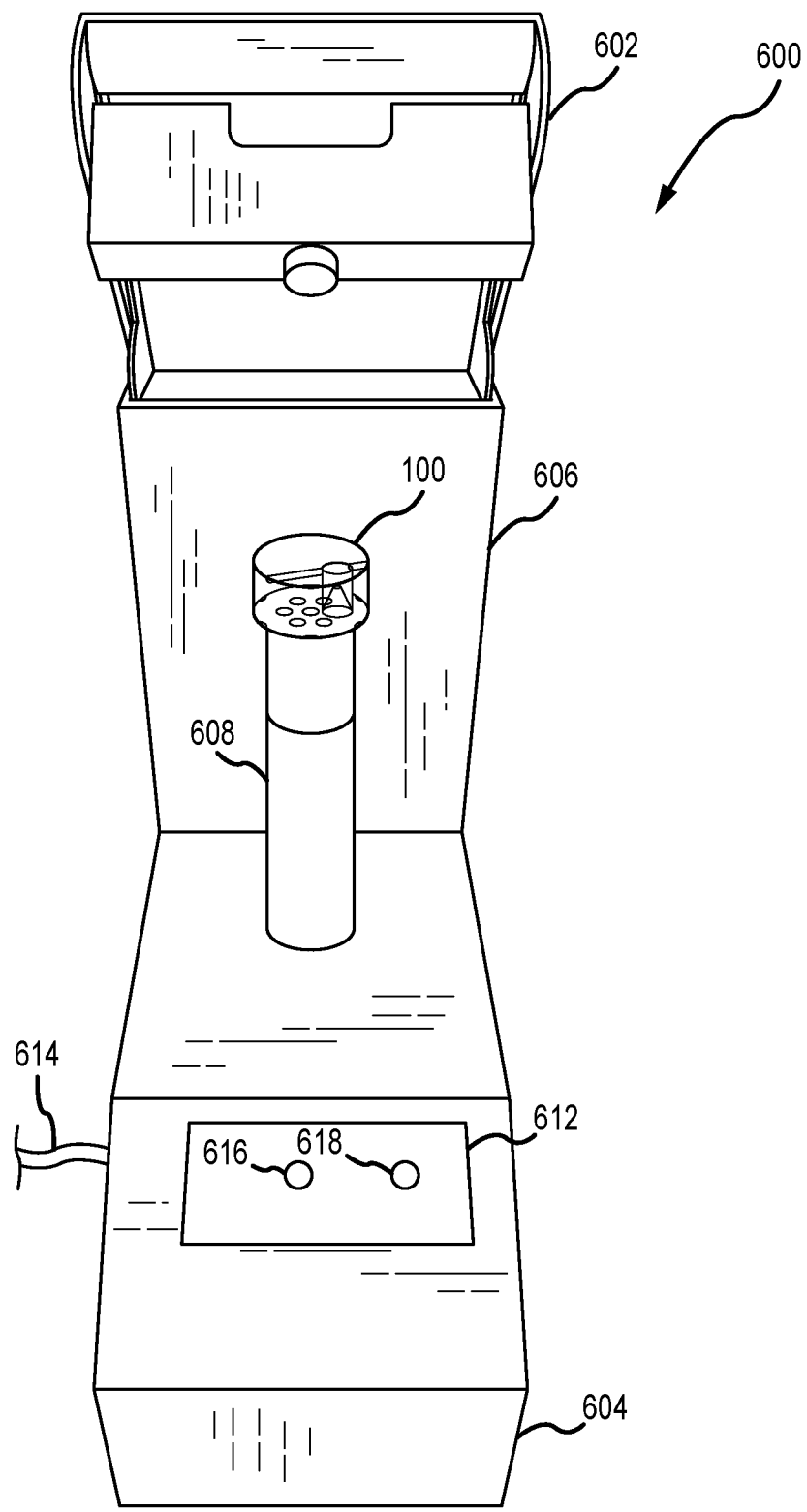
FIG. 6 is a first perspective view of a first example embodiment of a dry ice dispensing device, in which a support member of the device is in a raised position.
Figure 7:
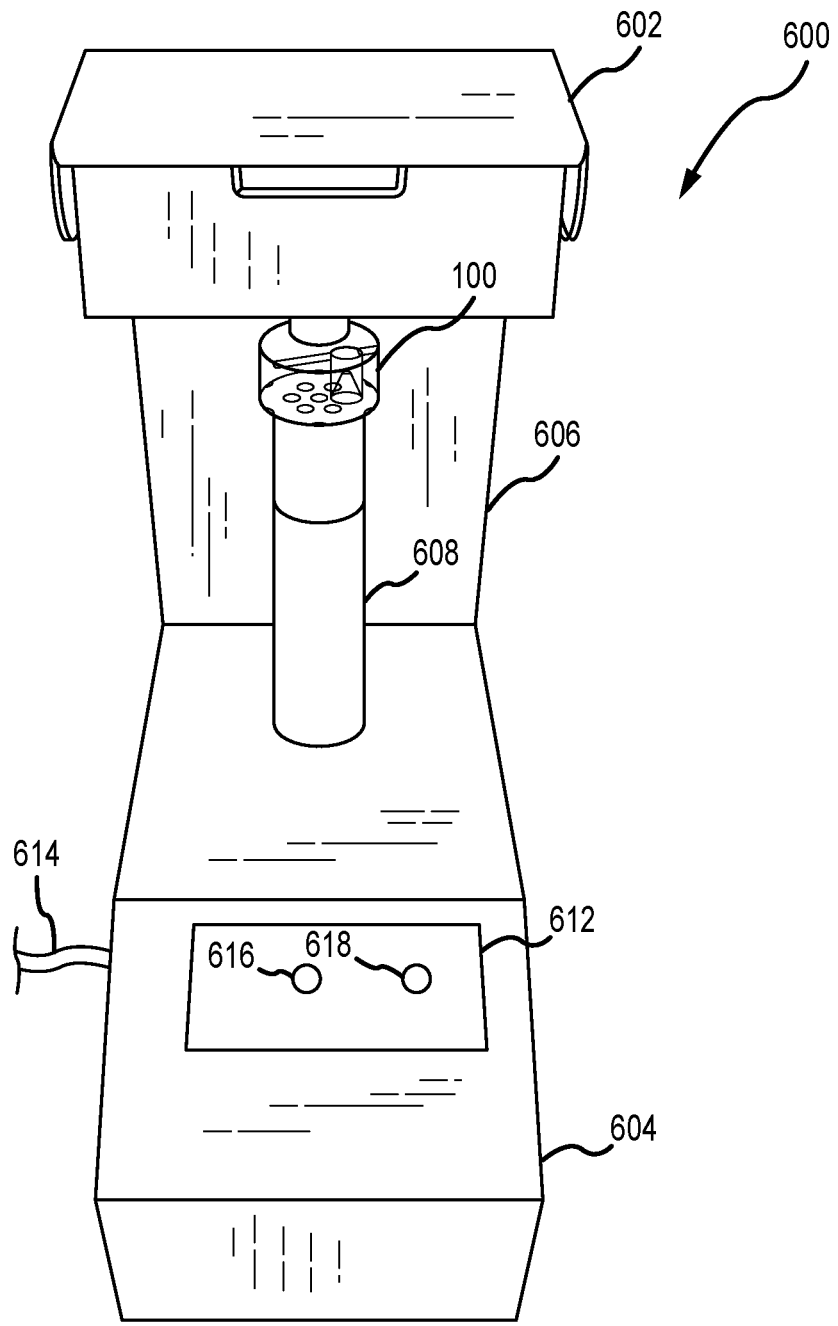
FIG. 7 is a second perspective view of the first example embodiment of the dry ice dispensing device shown in FIG. 6, in which the support member of the device is in a lowered position.
Figure 8:
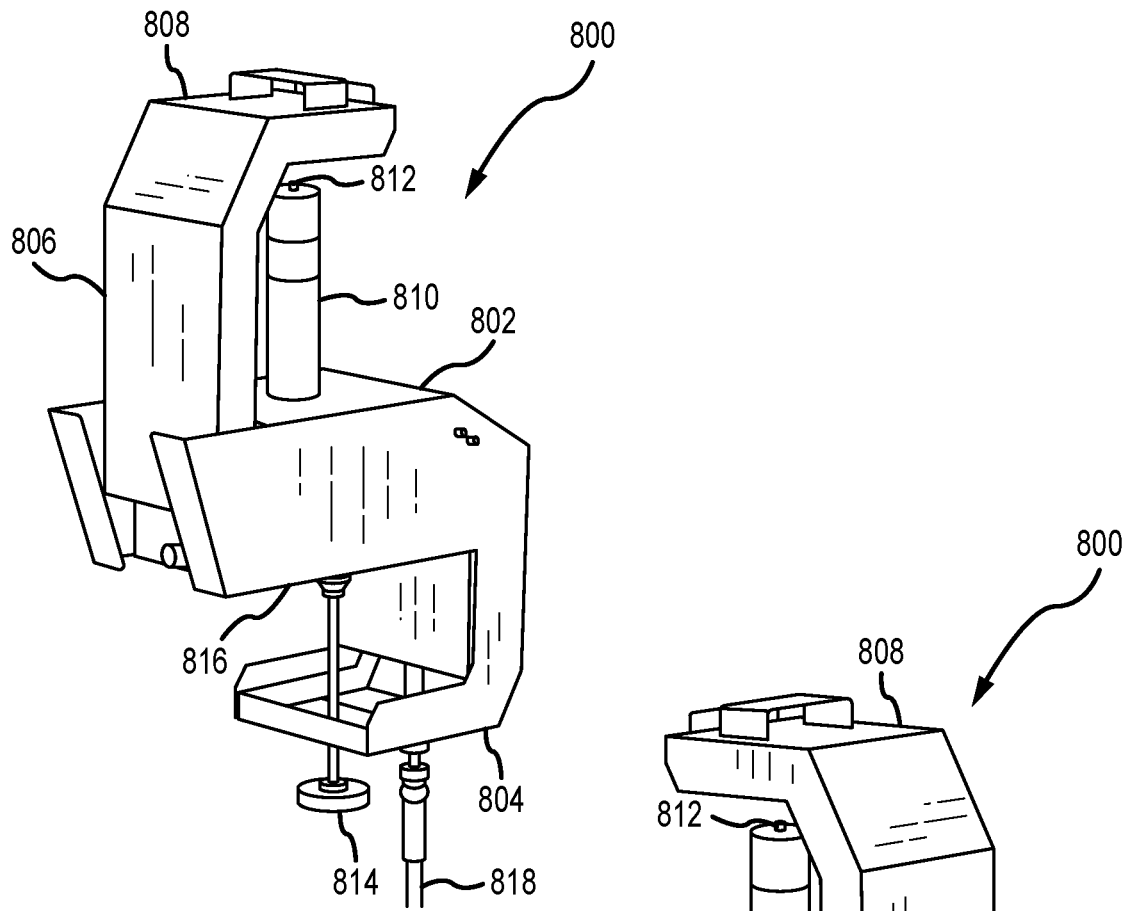
FIG. 8 is a first perspective view of a second example embodiment of a dry ice dispensing device.

FIG. 6 is a first perspective view of a first example embodiment of a dry ice dispensing device 600, in which a support member 602 of device 600 is in a raised position. FIG. 7 is a second perspective view of the first example embodiment of dry ice dispensing device 600, in which support member 602 is in a lowered position.

Accordingly, with reference to FIG. 6 and FIG. 7, dry ice dispensing device 600 includes a base 604, a body 606, and support member 602. In general terms, body 606 extends between and mechanically couples base 604 and support member 602. For example, support member 602 can be hingeably or rotatably attached to base 604 in a manner that permits raising and lowering of support member 602. In the example embodiment, a pedestal 608 extends vertically from base 604 toward support member 602. Pedestal 608 includes an ejection nozzle, which in the views of FIG. 6 and FIG. 7, is engaged with dry ice receptacle 100. In various embodiments, the ejection nozzle of device 600 is substantially identical to ejection nozzle 8012 of dry ice dispensing device 800.

As shown, base 604 includes a control panel 612, which may permit selection of a volume of dry ice to be dispensed, such as, in the example embodiment, a "full shot," and/or a "half shot." Specifically, a full shot button 616 and a half shot button 618 may be provided on control panel 612. As used herein, the term "full shot" may specify a first volume of dry ice to be dispensed, and "half shot" may specify a second volume, less than the first volume (e.g., half of the first volume) of dry ice to be dispensed.

These volumes (e.g., full shot and half shot) may be predefined or preset in a memory device of dry ice dispensing device 600 and/or adjusted by way of one or more tuning knobs included on dry ice dispensing device 600. For example, memory device may define a first discharge time and a second discharge time in association with each of the full shot and half shot options, respectively, where the first discharge time (for a full shot) is twice the discharge time associated with a half shot. As a result, a half shot may cause dry ice dispensing device to dispense approximately half the volume of dry ice that is dispensed as compared to the volume dispensed for a full shot. In another embodiment, the memory device may specify one or more other parameters, such as volume, time, and/or density, to control the volume of dry ice dispensed, the density of dry ice dispensed, and/or the time period during which dry ice is dispensed. In some embodiments, these parameters may be replaced and/or used in combination by one or more sensors detecting volume, time, density, and the like.

Specifically, in at least one embodiment, a first tuning knob may be may be manually adjusted to change a volume associated with a full shot, and a second tuning knob may be manually adjusted to change a volume associated with a half shot. Although two dispensation volumes are illustrated, it will be appreciated that control panel 612 may include a variety of options, including a greater number of dispensation volume selections (e.g., quarter shot, double shot, etc).

In the example embodiment, dry ice dispensing device 600 receives liquid carbon dioxide from a liquid carbon dioxide storage cylinder or storage tank that is fluidly coupled to an input port of dry ice dispensing device 600. Specifically, a hose or tube 614 may connect between base 604 and a carbon dioxide storage cylinder to bring liquid carbon dioxide to base 604. In some embodiments, dry ice dispensing device 600 may include a plurality of input ports, such as for example, a rear-facing input port, a front-facing input port, and/or one or more side-facing input ports. A variety of input ports may permit positioning of dry ice dispensing device 600 relative to a carbon dioxide storage cylinder in an optimal orientation and/or position (e.g., on a bar top).

Inside dry ice dispensing device 600, plumbing, such as network or manifold system pipes or tubes (see, e.g., FIG. 13), may couple to each of the one or more input ports. The system may, in addition, transfer liquid carbon dioxide received at the one or more input ports up through an interior of pedestal 608, through a control valve 1302, to the ejection nozzle, where the liquid carbon dioxide may, as described herein, be released into dry ice receptacle 100 seated on the pedestal 908 and/or ejection nozzle. Accordingly, dry ice dispensing device 600 is configured, in part, to receive and release liquid carbon dioxide (which crystallizes, as described below) into dry ice receptacle 100.

Dry ice dispensing device 600 may also include a control system, such as, for example, a controller or processor and a memory device coupled to the controller or processor. In general terms, the control system may operate to provide an electrical control signal (e.g., on/off or open/close) to control valve 1302, such as in response to a user selecting full shot button 616 and/or half shot button 618. In at least one embodiment, the control system may, for example, operate control valve 1302 to open, and remain in an open position, for a time period associated with the selected full shot or half shot option, following which, the control system may operate to close control valve 1302.

As described herein, dry ice receptacle 100 can be seated and/or engaged on an ejection nozzle of pedestal 608. More particularly, central hole 125 (also referred to herein as the dispensing hole) of first portion 102 of dry ice receptacle 100 may be seated over an ejection nozzle on pedestal 608, such that the ejection nozzle is capable of dispensing liquid carbon dioxide into dry ice receptacle 100 through central hole 125. A flat support surface of pedestal 608 may stabilize and support dry ice receptacle 100 on pedestal when dry ice receptacle 100 is positioned to be charged or filled.

During operation, as liquid carbon dioxide is dispensed into dry ice receptacle 100, it will be appreciated that the liquid carbon dioxide undergoes a rapid depressurization as it exits the ejection nozzle and enters dry ice receptacle 100, which causes at least some of the liquid carbon dioxide to vaporize, thereby rapidly cooling the remaining liquid carbon dioxide into a crystallized solid phase, also known as dry ice. In at least some embodiments, the crystallized dry ice may be referred to as a low density form of dry ice, inasmuch as the low density form of dry ice crystallized and contained in dry ice receptacle 100.

Further, in operation, dry ice dispensing device 600 may include a safety mechanism (such as a sensor) that detects whether support member 602 is in a lowered or raised position. Specifically, the control system may receive a sensor signal from the sensor indicating whether support member 602 is raised or lowered. If support member 602 is raised, the control system may prevent opening of control valve 1302, even in the event that a user selects one of buttons 616 and/or 618. However, if support member 602 is lowered, the control system may permit operation of dry ice dispensing device, as described herein.

In at least one embodiment, one technical improvement embodied by support member 602 of dry ice dispensing device 600 is therefore that dry ice dispensing device 600 includes a safety mechanism that prevents operation and dispensation of liquid carbon dioxide/dry ice when support member 602 is not in a lowered position. Further, in a lowered position, support member 602 may engage with second portion 104 of dry ice receptacle 100, such as by laying flat and/or applying a down force on dry ice receptacle 100, which secures dry ice receptacle 100 between pedestal 608 and support member 602.

Securing dry ice receptacle 100 between support member 602 and pedestal 608 prevents dry ice receptacle 100 from being swept off or ejected from pedestal 608 under the upward force exerted by liquid carbon dioxide entering dry ice receptacle 100. Thus, dry ice dispensing device 600 is arranged to secure dry ice receptacle 100 between pedestal 608 and support member 610, and in at least some embodiments, prevents charging or filling of dry ice receptacle 100 when support member 602 is not lowered on dry ice receptacle 100.

FIG. 8 through FIG. 12 show different views of a second example embodiment of a dry ice dispensing device 800. Dry ice dispensing device 800 is similar to dry ice dispensing device 600, except, in at least one aspect, that in this embodiment, dry ice dispensing device 800 is arranged to be clamped or otherwise secured on a work surface 1002, such as a bar top.

Accordingly, in the example embodiment, dry ice dispensing device 800 includes a base 802, a mounting bracket 804, a riser 806, and a support member 808. As shown, mounting bracket 804 depends from base 802 and, in at least one embodiment, is L-shaped. Riser 806 extends upward from base 802 and couples to support member 808. In the example embodiment, dry ice dispensing device 800 also includes a pedestal 810 that extends toward support member 808 and that terminates in an ejection nozzle 812.

Figure 9:
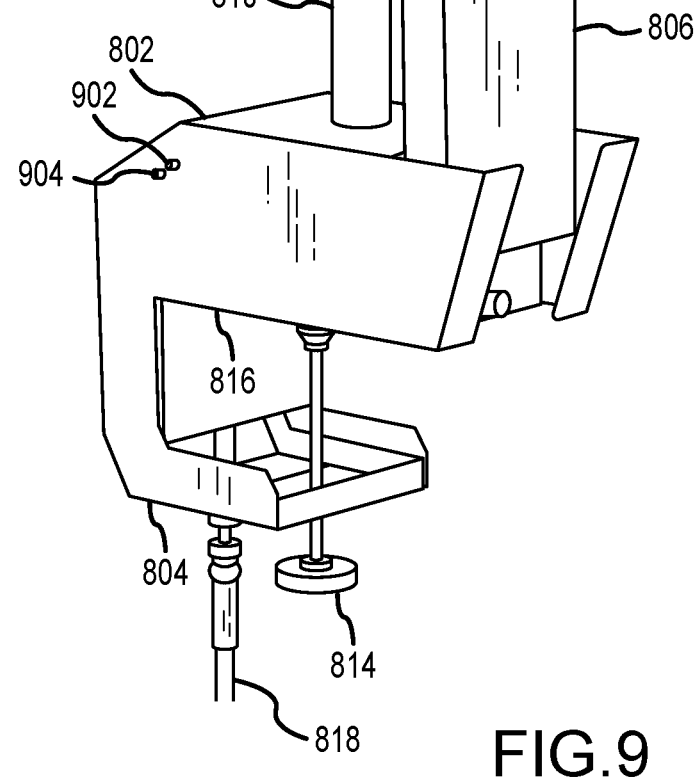
FIG. 9 is a second perspective view of the second example embodiment of the dry ice dispensing device shown in FIG. 8.

As best shown with reference to FIG. 9, base 802 includes a first tuning knob 902, which may be rotated to adjust a volume of dry ice that will be dispensed. For example, as described above, first tuning knob 902 may be rotated to control a volume to be dispensed in association with a "full shot." However, in other embodiments, first tuning knob 902 may simply be used to adjust a volume of dry ice to be dispensed. Likewise, base 802 includes a second tuning knob 904, which may also be rotated to adjust a volume of dry ice to be dispensed, such as, in association with a "half shot."

Although two dispensation volumes are illustrated, it will be appreciated that any suitable number of tuning knobs may be provided (e.g., quarter shot, double shot, etc). Further, as described above, tuning knobs 902 and 904 may also be used to adjust a time that dry ice will be dispensed (e.g., corresponding to a volume), a density of dry ice that will be dispensed, and/or an granule size of dry ice when it is dispensed.

In some embodiments, dry ice dispensing device 800 may include a control panel, which may permit selection of a volume of dry ice to be dispensed, such as, in the example embodiment, a "full shot," and/or a "half shot." Specifically, a full shot button and a half shot button may be provided, as described herein, on the control panel.

In the example embodiment, dry ice dispensing device 800 may also include a securing member 814, which is least partially threaded, and which is configured to engage and/or mate with a threaded portion of mounting bracket 804. More particularly, securing member 814 may be threaded through the threaded portion of mounting bracket 804 and rotated or turned (e.g., clockwise or counterclockwise) to extend and retract securing member 814.

Figure 10:
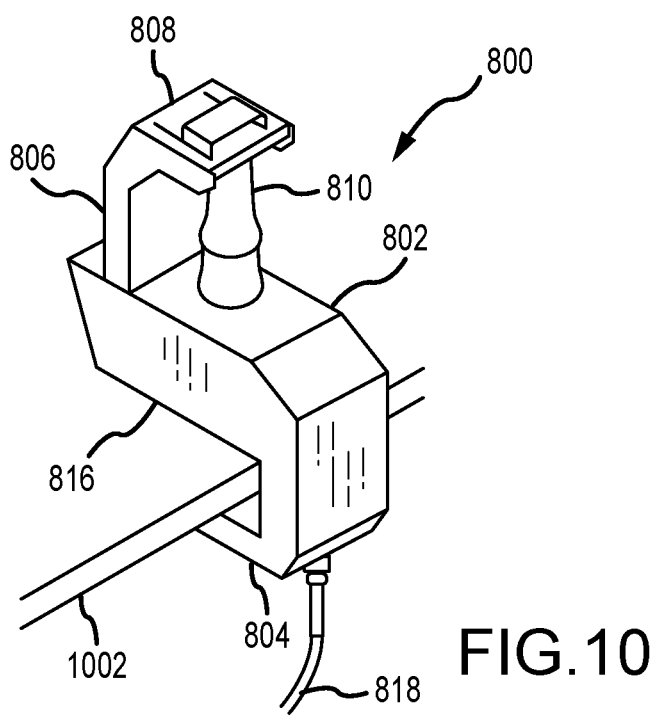
FIG. 10 is a third perspective view of the second example embodiment of the dry ice dispensing device shown in FIG. 8, in which the dry ice dispensing device is mounted to a work surface.
Figure 11:
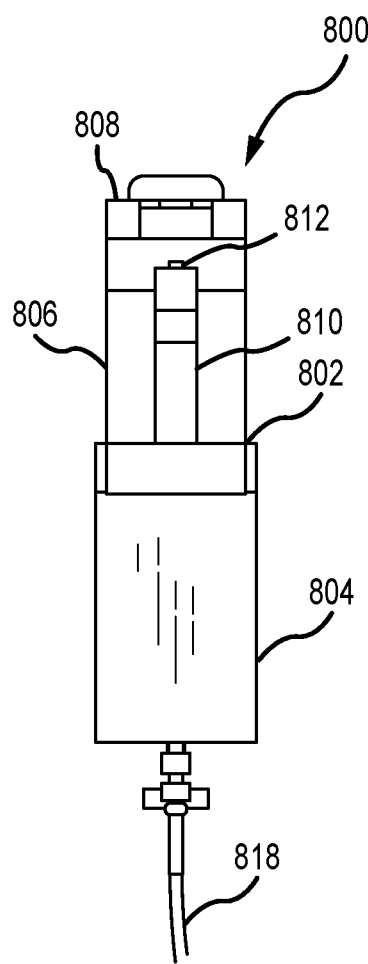
FIG. 11 is a front view of the second example embodiment of the dry ice dispensing device shown in FIG. 8.
Figure 12:
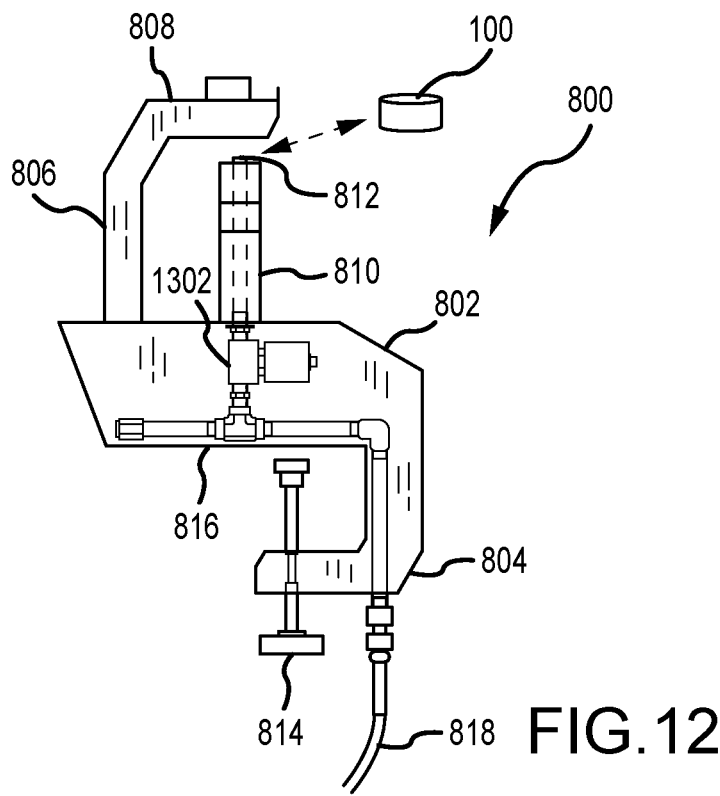
FIG. 12 is a side view of the second example embodiment of the dry ice dispensing device shown in FIG. 8.

As a result, as shown with reference to FIG. 10, in operation, it will be appreciated that mounting bracket 804 may be engaged on a work surface 1002 (e.g., a countertop), such as by laying an engagement surface 816 of base 802 on the work surface 1002 and hooking mounting bracket 804 over and edge of the work surface 1002. Once dry ice dispensing device 800 is positioned as desired, securing member 814 may be rotated through the threaded portion of mounting bracket 804 until securing member 814 contacts an underside of work surface 1002, thereby securing dry ice dispensing device 800 on the work surface 1002.

As described herein, in the example embodiment, dry ice dispensing device 800 receives liquid carbon dioxide from a liquid carbon dioxide storage cylinder or storage tank that is fluidly coupled to an input port of dry ice dispensing device 800. Specifically, a hose or tube 818 may connect between base 802 and a carbon dioxide storage cylinder to bring liquid carbon dioxide to base 802. In some embodiments, dry ice dispensing device 800 may include a plurality of input ports, such as for example, a rear-facing input port, a front-facing input port, and/or one or more side-facing input ports. A variety of input ports may permit positioning of dry ice dispensing device 800 relative to a carbon dioxide storage cylinder in an optimal orientation and/or position (e.g., on a bar top).

Inside dry ice dispensing device 800, a system pipes or tubes (see, e.g., FIG. 13), may couple to each of the one or more input ports. The system may, in addition, transfer liquid carbon dioxide received at the one or more input ports up through control valve 1302, through an interior of pedestal 810, to ejection nozzle 812, where the liquid carbon dioxide may, as described herein, be released into dry ice receptacle 100 seated on ejection nozzle 812. Accordingly, dry ice dispensing device 800 is configured, in part, to receive and release liquid carbon dioxide (which crystallizes, as described below) into dry ice receptacle 100.

Dry ice dispensing device 800 may also include a control system, such as, for example, a controller or processor and a memory device coupled to the controller or processor. In general terms, the control system may operate to provide an electrical control signal (e.g., on/off or open/close) to control valve 1302, such as in response to a user selecting full shot button and/or half shot button, and/or in response to depression of one of tuning knobs 902 and/or 904, which may function, in at least some embodiments, as full shot and half shot buttons when depressed (as opposed to being rotated to control a time or volume of dry ice dispensed). In at least one embodiment, the control system may, for example, operate control valve 1302 to open, and remain in an open position, for a time period associated with the selected full shot or half shot option, following which, the control system may operate to close control valve 1302.

As described herein, dry ice receptacle 100 can be seated and/or engaged on ejection valve 812 of pedestal 810. More particularly, central hole 125 of first portion 102 of dry ice receptacle 100 may be seated over ejection nozzle 812, such that ejection nozzle 812 is capable of dispensing liquid carbon dioxide into dry ice receptacle 100 through central hole 125. A flat support surface of pedestal 810 may stabilize and support dry ice receptacle 100 on pedestal 810 when dry ice receptacle 100 is positioned to be charged or filled.

In operation, and in at least one embodiment, dry ice dispensing device 800 may include a safety mechanism (such as a sensor) that detects whether support member 808 is in a lowered or raised position. Specifically, the control system may receive a sensor signal from the sensor indicating whether support member 808 is raised or lowered. If support member 808 is raised, the control system may prevent opening of control valve 1302. However, if support member 808 is lowered, the control system may permit operation of dry ice dispensing device 800, as described herein.

In addition, in some embodiments, one or more other safety mechanisms may be included, such as for example, determining that dry ice receptacle 100 has already been injected with dry ice or filled (e.g., using a contact sensor on pedestal 810), determining a size of dry ice receptacle 100 and comparing the size of dry ice receptacle 100 to a selected volume of dry ice, and the like. For example, in the latter case, dry ice dispensing device 800 may determine that a full shot has been selected, but that dry ice receptacle 100 is only configured to receive a half shot, such as by manual entry by the user of the size of dry ice receptacle 100, in which case, dry ice dispensing device 800 may display an error message, cancel the requested dispensing operation, and the like.

In at least one embodiment, one technical improvement embodied by support member 808 of dry ice dispensing device 800 is therefore that dry ice dispensing device 800 includes a safety mechanism that prevents operation and dispensation of liquid carbon dioxide/dry ice when support member 808 is not in a lowered position. Further, in a lowered position, support member 808 may engage with second portion 104 of dry ice receptacle 100, such as by laying flat and/or applying a down force on dry ice receptacle 100, which secures dry ice receptacle 100 between pedestal 810 and support member 808.

Securing dry ice receptacle 100 between support member 808 and pedestal 810 prevents dry ice receptacle 100 from being swept off or ejected from pedestal 810 under the upward force exerted by liquid carbon dioxide exiting ejection nozzle 812. Thus, dry ice dispensing device 800 is arranged to secure dry ice receptacle 100 between pedestal 810 and support member 808, and in at least some embodiments, prevents charging or filling of dry ice receptacle 100 when support member 808 is not lowered on dry ice receptacle 100.

Figure 13:
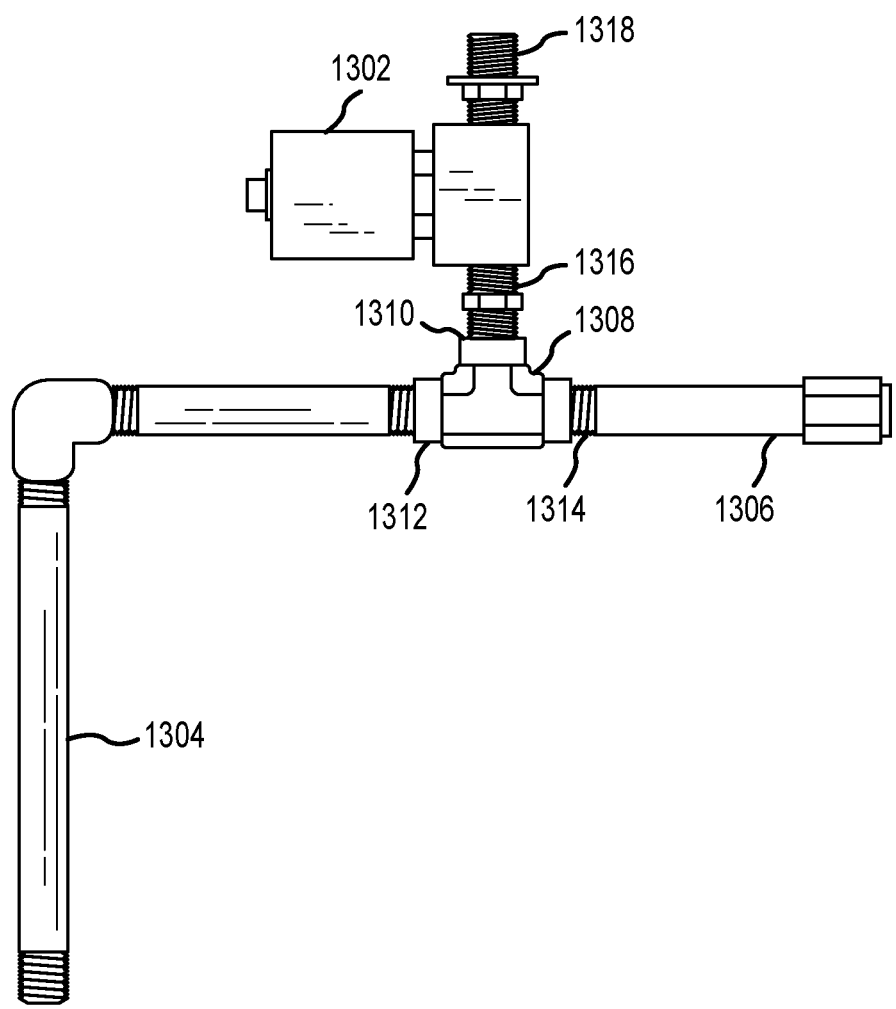
FIG. 13 is a side view of an example embodiment of a control valve of one or more of the example embodiments of the dry ice dispensing devices shown in FIG. 6 and/or FIG. 8.

FIG. 13 is a side view of an example embodiment of a control valve 1302 of the example embodiments of the dry ice dispensing devices 600 and 900. In the example embodiment, control valve 1302 may be disposed at any location within dry ice dispensing devices 600 and/or 800, such as, for example, within base 604 and/or base 802. In at least one embodiment, control valve 1302 is any electronically actuable control valve capable of operating at low temperature (e.g., temperatures associated with liquid carbon dioxide and/or dry ice). For example, in some embodiments, control valve 1302 is a low temperature solenoid valve, such as a low temperature solenoid valve for industrial fluid control.

In addition, as discussed above, control valve 1302 may receive a flow of liquid carbon dioxide from a carbon dioxide storage reservoir (e.g., a storage take or storage cylinder) by way of one or more pipes, hoses, or tubes. For example, as shown, a first pipe 1304 may couple to one inlet port of a dry ice dispensing device 600 and/or 800, and a second pipe 1306 may couple to another inlet port of a dry ice dispensing device 600 and/or 800. In addition, one or more other pipes may be provided, such as, for example, where there are additional input ports, and each pipe may be arranged to receive and transfer carbon dioxide from a respective input port.

Each of the pipes 1304 and 1306 converges on and couples, in the example embodiment, to a respective inlet of a suitable pipe connector 1308, such as a T-connector (in the example shown), which is coupled at an outlet 1310 to control valve 1302. In the example embodiment, first pipe 1304 connects to pipe connector 1308 at a first inlet 1312, and second pipe 1306 connects to pipe connector 1308 at a second inlet 1314. In some embodiments, control valve 1302 may connect to outlet 1310 of pipe connector 1308 by way of a first threaded pipe fitting 1316 (e.g., a hex fitting). Likewise, control valve 1302 may connect, at an outlet thereof, to a second threaded pipe fitting 1318 (e.g., a hex fitting), which may couple to a tube or pipe that extends within a pedestal 608 and/or 810 of dry ice dispensing devices 600 and/or 800 to a respective ejection nozzle (e.g., ejection nozzle 812). Thus, control valve 1302 is fluidly coupled between a liquid carbon dioxide storage reservoir and an ejection nozzle in dry ice dispensing devices 600 and/or 800.

A dry ice receptacle and a dry ice dispensing device are thus disclosed. In various embodiments, the dry ice receptacle includes a generally cylindrical object, which may taper between an upper surface and a lower surface, and which defines a receiving chamber or interior portion, within which dry ice may form and crystallize and from which dry ice may be allowed to sublimate. In some embodiments, the dry ice receptacle includes a straw channel, which may extend between the upper surface and the lower surface, and which may be arranged to receive, and create an interference fit with, a drinking straw. The dry ice receptacle may be deposited in a liquid, such as a beverage, and maintained, at least partially, in a submerged condition by a force applied by the drinking straw. Further, in at least some embodiments, a groove or channel may run along the lower surface of the dry ice receptacle to channel the beverage into the straw channel. In some embodiments, a pocket or reservoir may be included between the straw channel and the groove to permit accumulation of liquid for better uptake by the drinking straw. A plurality of holes may, in addition, be disposed in the upper surface. These may permit entry of the liquid into contact with the dry ice contained in the receptacle, and escape of carbon dioxide gas into the liquid as the dry ice sublimates in the presence of the liquid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dry ice receptacle comprising:
   a substantially planar first portion defining a first opening and at least one additional opening;
   a substantially planar second portion defining a second opening;
   a curved exterior sidewall extending between the first portion and the second portion, and connecting the first portion and second portion, to define a receiving chamber for containing a volume of dry ice; and
   a curved interior sidewall extending between the first opening and the second opening, the interior sidewall radially inward of the exterior sidewall and spaced apart from the exterior sidewall, the interior sidewall defining a straw channel that entirely traverses the receiving chamber, wherein the straw channel is configured to receive and engage a drinking straw, such that in use, receiving and engaging the drinking straw facilitates retaining the dry ice receptacle within a drinking vessel.

2. The dry ice receptacle of claim 1, wherein the straw channel defined by the curved interior sidewall at least partially tapers between the first opening and the second opening.

3. The dry ice receptacle of claim 1, wherein the curved interior sidewall isolates the straw channel from the receiving chamber, such that the curved interior sidewall excludes the volume of dry ice from the straw channel and is configured to permit fluid flow through the straw channel.

4. The dry ice receptacle of claim 1, wherein the curved interior sidewall further defines i) an intermediate opening between the first opening and the second opening and ii) a fluid reservoir that extends between the second opening and the intermediate opening.

5. The dry ice receptacle of claim 1, wherein the second portion includes an outer surface and an inner surface, and wherein the outer surface includes at least one fluid channel that extends between an edge of the second portion and the second opening, and wherein the at least one fluid channel is configured to transport a liquid from the edge of the second portion to the second opening when the dry ice receptacle is submerged in the liquid.

6. The dry ice receptacle of claim 1, wherein the exterior sidewall extends one of i) substantially orthogonally or ii) at an angle between the first portion and the second portion, and wherein the dry ice receptacle is one of i) substantially cylindrically shaped or ii) in the shape of a truncated cone.

7. The dry ice receptacle of claim 1, wherein the at least one additional opening is configured to engage with a carbon dioxide dispensing device to receive carbon dioxide as dry ice within the receiving chamber of the dry ice receptacle.

8. The dry ice receptacle of claim 1, wherein the substantially planar first portion further comprises a plurality of additional openings, each opening of the plurality of additional openings arranged to be in fluid communication with a liquid when the dry ice receptacle is submerged in the liquid.

9. A container for holding a volume of dry ice, the container comprising:
   a substantially planar first portion including at least a first aperture and at least one additional aperture;
   a substantially planar second portion including at least a second aperture;
   a third portion extending between the first portion and the second portion, the third portion connecting the first portion and the second portion, wherein the first portion, the second portion, and the third portion define an interior region of the container for containing a volume of dry ice; and
   a fourth portion extending between the first portion and the second portion, the fourth portion disposed radially inward of the third portion and spaced apart from the third portion, wherein the fourth portion defines a straw channel that entirely traverses the interior region, wherein the straw channel fluidly couples the first aperture to the second aperture, wherein the straw channel is configured to receive and engage a drinking straw, such that in use, receiving and engaging the drinking straw facilitates retaining the container within a drinking vessel.

10. The container of claim 9, wherein the straw channel defined by the third portion at least partially tapers between the first aperture and the second aperture.

11. The container of claim 9, wherein the fourth portion isolates the straw channel from the interior region, such that the fourth portion excludes the volume of dry ice contained by the interior region from the straw channel and is configured to permit fluid flow through the straw channel.

12. The container of claim 9, wherein the second portion includes an outer surface and an inner surface, wherein the inner surface is configured to contact dry ice contained within the interior region, wherein the outer surface is configured to contact a liquid surrounding the container and includes at least one groove that extends between an edge of the second portion and the second aperture, and wherein the at least one groove is configured to transport the liquid from the edge of the second portion to the second aperture.

13. The container of claim 9, wherein the third portion extends at an angle between the first portion and the second portion, and wherein the container is shaped to engage nonvertical sides of a drinking vessel.

14. The container of claim 9, wherein the first portion further comprises a plurality of additional apertures, wherein each aperture of the plurality of additional apertures is configured to be in fluid communication with a liquid when the container is submerged in the liquid, and wherein at least one aperture of the plurality of apertures is further configured to engage with a dry ice dispensing device prior to the container being submerged in the liquid.

15. The container of claim 9, wherein at least the first portion and the second portion comprise one of i) a rigid plastic that is not substantially deformable when the container is placed in a drinking vessel, or ii) a non-rigid plastic that is substantially deformable when the container is placed in a drinking vessel, whereby, when the first portion and the second portion comprise the non-rigid plastic, the container is capable of frictionally engaging the drinking vessel.

16. A system comprising:
a dry ice dispensing device comprising:
a control valve configured to receive liquid carbon dioxide; and
an ejection nozzle coupled to the control valve, the ejection nozzle configured to receive the liquid carbon dioxide from the control valve, the ejection nozzle further configured to dispense dry ice in response to the control valve being opened; and
a dry ice receptacle configured to be placed in a drinking vessel, the dry ice receptacle comprising:
a substantially planar first portion defining a first opening and a dispenser opening, wherein the dry ice receptacle is configured to be seated on the ejection nozzle, and wherein the dry ice receptacle is configured to receive dry ice from the ejection nozzle through the dispenser opening;
a substantially planar second portion defining a second opening;
a curved exterior sidewall extending between the first portion and the second portion, and connecting the first portion and second portion, to define a receiving chamber for containing a volume of dry ice; and
a curved interior sidewall extending between the first opening and the second opening, the interior sidewall radially inward of the exterior sidewall and spaced apart from the exterior sidewall, the interior sidewall defining a straw channel that entirely traverses the receiving chamber, wherein the straw channel is configured to receive and engage a drinking straw, such that in use, receiving and engaging the drinking straw facilitates retaining the dry ice receptacle within the drinking vessel.

17. The system of claim 16, wherein the dry ice dispensing device further comprises a support member arranged to engage and disengage the second portion of the dry ice receptacle to hold the dry ice receptacle in the seated position on the ejection nozzle when dry ice is being dispensed.

18. The system of claim 17, wherein the support member is configured to engage and disengage the second portion of the dry ice receptacle, and wherein the dry ice dispensing device is configured to close the control valve in response to the support member disengaging the second portion of the dry ice receptacle.

19. The system of claim 16, wherein the straw channel defined by the curved interior sidewall at least partially tapers between the first opening and the second opening.

20. The system of claim 16, wherein the dry ice dispensing device includes a plurality of input ports, wherein each input port is configured to one of i) engage a plug when not being used, or ii) receive liquid carbon dioxide from a liquid carbon dioxide storage container when being used.

* * * * *